US008326026B2

(12) United States Patent
Le Meur et al.

(10) Patent No.: US 8,326,026 B2
(45) Date of Patent: Dec. 4, 2012

(54) METHOD OF OBTAINING A SALIENCY MAP FROM A PLURALITY OF SALIENCY MAPS CREATED FROM VISUAL QUANTITIES

(75) Inventors: Olivier Le Meur, Talensac (FR); Patrick Le Callet, Le Pallet (FR); Dominique Barba, Carquefou (FR)

(73) Assignee: Thomson Licensing, Boulogne-Billancourt (FR)

( * ) Notice: Subject to any disclaimer, the term of this patent is extended or adjusted under 35 U.S.C. 154(b) by 1076 days.

(21) Appl. No.: 11/988,262

(22) PCT Filed: Jul. 5, 2006

(86) PCT No.: PCT/EP2006/063901
§ 371 (c)(1),
(2), (4) Date: Jan. 4, 2008

(87) PCT Pub. No.: WO2007/003651
PCT Pub. Date: Jan. 11, 2007

(65) Prior Publication Data
US 2009/0110269 A1 Apr. 30, 2009

(30) Foreign Application Priority Data
Jul. 6, 2005 (FR) ...................................... 05 52076

(51) Int. Cl.
*G06K 9/00* (2006.01)
(52) U.S. Cl. ...................................................... 382/162
(58) Field of Classification Search .................. 382/100, 382/103, 128, 162, 165, 166, 190, 219, 236; 375/240.16
See application file for complete search history.

(56) References Cited

U.S. PATENT DOCUMENTS

| 6,282,317 | B1 | 8/2001 | Luo et al. |
| 6,320,976 | B1* | 11/2001 | Murthy et al. ............... 382/128 |
| 7,116,716 | B2* | 10/2006 | Ma et al. ................. 375/240.16 |
| 7,130,461 | B2* | 10/2006 | Rosenholtz ................. 382/165 |

FOREIGN PATENT DOCUMENTS

| EP | 0961225 | 12/1999 |
| EP | 1453002 | 9/2004 |
| EP | 1544792 | 6/2005 |
| FR | 2851677 | 8/2004 |
| WO | WO 00/13407 | 3/2000 |

OTHER PUBLICATIONS

Search Report Dated Dec. 7, 2006.
Koike, "Stochastic Saliency-Based Seerch Model for Attention Shifts", one page Abstract, Published on 2003.

* cited by examiner

*Primary Examiner* — Duy M Dang
(74) *Attorney, Agent, or Firm* — Tutunjian & Bitetto, P.C.

(57) ABSTRACT

A method of obtaining a saliency map from a plurality of saliency maps created from different visual quantities. Initially the saliency maps are normalized based on a theoretical maximum of each visual quantity. An intra-competition step selects the main saliency areas in each saliency map. An inter-competition step is then performed based on a sum of the intra-map competition with an inter-map redundancy term that is a function of the product of the intra-map competitions and of the probability of a site appearing on the saliency maps.

5 Claims, 1 Drawing Sheet (a)          (b)          (c)          (d)          (e)

METHOD OF OBTAINING A SALIENCY MAP FROM A PLURALITY OF SALIENCY MAPS CREATED FROM VISUAL QUANTITIES

CROSS REFERENCE TO RELATED APPLICATIONS

This application claims the benefit, under 35 U.S.C. §365 of International Application PCT/EP06/063901, filed Jul. 5, 2006, which was published in accordance with PCT Article 21(2) on Jan. 11, 2007 in English and which claims the benefit of French patent application No. 0552076, filed Jul. 6, 2005.

BACKGROUND

1. Field of the Invention

The invention relates to a method of obtaining a saliency map from a plurality of saliency maps created from different visual quantities.

Human beings have a selective visual attention, meaning that our visual system responds primarily to a certain number of signals originating from the objects and events of our environment.

The signal that most obviously and most intuitively attracts our attention is undoubtedly the sudden appearance of an object in a scene.

2. Related Art

Finally, various studies seek to estimate, from real fixed points, the similarities of the visual characteristics attracting our gaze. As a general rule, these studies relate to the measurement of various quantities such as the variance normalized by the average brightness of the image, the entropy and the correlation between the measured fixed point and its vicinity. The main conclusions are as follows:

- the contrast measurements of the fixed regions are higher than those of regions taken at random. In other words, the contrast of an area, regardless of its nature (luminance, colour, movement, texture, etc.), attracts our attention even when this area has nothing to do with the task to be carried out by the observer.
- based on the correlation measurements, these studies also show that the fixed regions differ from their vicinity.

The detection of saliency points in an image makes it possible subsequently to improve encoding and indexing methods. Obtaining saliency maps as a way of obtaining a list of the salient points of an image is described in the European patent application published under the number EP1544792, filed under the name of Thomson Licensing SA on Dec. 18, 2003.

The creation of saliency maps is relative to different visual quantities: one saliency map possibly being relative to the chromatic components, one map for each chromatic component, or even relative to the achromatic components. However, once the different saliency maps have been created, merging them can generate undesirable results.

A conventional merging method consists in normalizing the different saliency maps so as to obtain the same dynamic range. The normalization of a map C, denoted N(C), uses the overall maximum determined on the map C. The final saliency map S is then simply obtained by the following relation:

$$CS(s)=N(N(CSA(s))+N(CS_{Cr1}(s))+N(CS_{Cr2}(s)))$$

with CSA(s) representing the saliency map of the achromatic component, $CS_{Cr1}(s)$ representing the saliency map of the first chromatic component and $CS_{Cr2}(s)$ representing the saliency map of the second chromatic component.

One advantage of this method is its simplicity. However, it does present various drawbacks:
- this method does not distinguish between a saliency map having a quasi-uniform distribution and a saliency map having one or more saliency peaks;
- when a number of saliency peaks are present in a saliency map, this type of merging clearly favours the highest saliency peak;
- this method is very sensitive to impulse noise,
- there is no interaction between maps.

SUMMARY OF THE INVENTION

The invention therefore proposes to remedy at least one of the abovementioned drawbacks. To this end, the invention proposes a method of obtaining a saliency map from a plurality of saliency maps created from different visual quantities. According to the invention, the method comprises

- a step for normalizing said saliency maps based on the theoretical maximum of each visual quantity,
- an intra-map competition step selecting the main saliency areas in each saliency map,
- an inter-map competition step based on the sum of the intra-map competitions with an inter-map redundancy term that is a function of the product of the intra-map competitions and of the probability of a site appearing on said saliency maps.

Such a method of merging saliency maps involves two competition methods:
- an intra-map competition for identifying the most relevant areas of the map;
- an inter-map competition exploiting the redundancy and complementarity of the different maps. The use of inter-map redundancy is a way of reinforcing the saliency of certain areas when the latter generate saliency in a number of dimensions. Conversely, when an area generates saliency only in one visual dimension, it is necessary to use the inter-map complementarity.

According to a preferred embodiment, in the normalization step,
- the sites of said saliency maps are normalized in relation to the theoretical maximum of the visual quantity value,
- said maps are quantized linearly using a predetermined number of levels.

According to a preferred embodiment, in the intra-map competition step,
- a preliminary list is defined, containing the sites said to be salient including sites for which the visual quantity value is high,
- the preliminary list of the sites said to be salient is scanned in descending order of said values, and the other sites said to be salient present in a circular area centred around the site said to be salient and of a predetermined radius are inhibited,
- a list of the salient sites is established, including the non-inhibited sites for which the ratio with the value of the next higher value site is greater than a predetermined threshold.

According to a preferred embodiment, the visual quantities are relative to the chromatic and achromatic components.

According to a preferred embodiment, the saliency maps relative to the chromatic components are merged and then the resultant saliency map is merged with the saliency map relative to the achromatic component.

BRIEF DESCRIPTION OF THE DRAWING

The invention will be better understood and illustrated by means of exemplary embodiments and advantageous implementation, by no means limiting, wherein.

DETAILED DESCRIPTION

Figure 2:
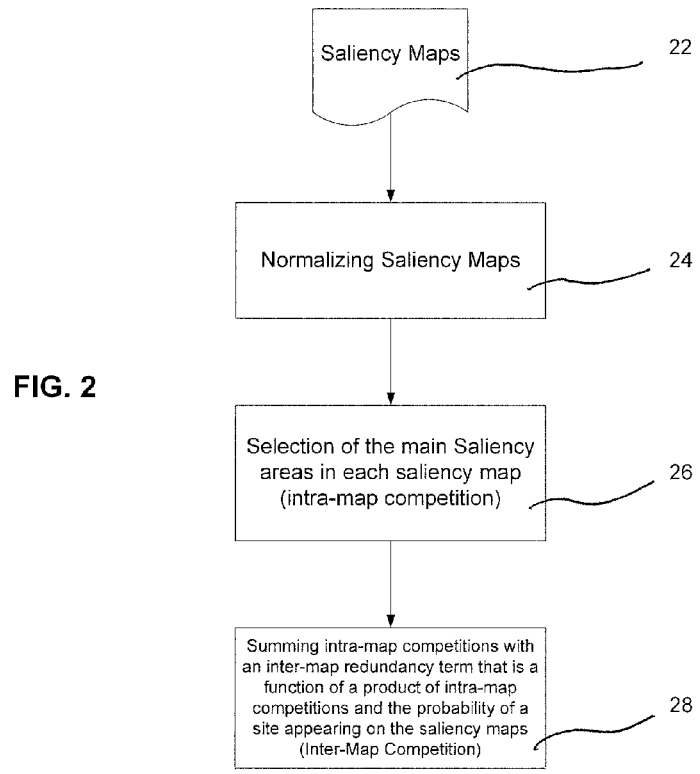
FIG. 2 is a block diagram of the exemplary implementation of method for obtaining a saliency map from a plurality of saliency maps created from different visual quantities according to an embodiment of the invention.

The embodiment described below proposes a coherent merging for two maps, denoted $CS^{Cr1}$ and $CS^{Cr2}$ derived from a component Cr1 and Cr2. Generalization to n saliency maps 20 (See FIG. 2) is easy to envisage.

The merging method comprises a preliminary dynamic normalization step 22. Unlike the known normalizations that use a normalization based on the overall maximum of each map, the normalization used in the merging method is based on the theoretical maximum of each visual dimension. These maximums are determined experimentally using particular tests. For example, for the component Cr1, an image with uniform luminance but having a saturated red pattern generates a dynamic close to the maximum dynamic of the visual axis Cr1. Repeating this type of experimentation is a way of defining the theoretical maximums of the components A, Cr1, Cr2.

The two maps $CS^{Cr1}$ and $CS^{Cr2}$ are then normalized and quantized linearly on L levels. After normalization and quantization, they are respectively denoted $CS_{NQ}^{Cr1}$ and $CS_{NQ}^{Cr2}$.

Following the normalization step 22, the method includes an intra-map competition step 24. This intra-map competition modifies the value of each site s of the maps $CS_{NQ}^{Cr1}$ and $CS_{NQ}^{Cr2}$ according to the nearest local maximum. This type of competition is given by the following relation:

$$IntraMap^{Cr1}(s) = \frac{CS_{NQ}^{Cr1}(s)}{NearestMaxc_{r1}(s)}$$

$$IntraMap^{Cr2}(s) = \frac{CS_{NQ}^{Cr2}(s)}{NearestMaxc_{r2}(s)}$$

The function $NearestMaxc_{r1}$ (respectively $NearestMaxc_{r2}$) returns the value of the local maximum of the component Cr1 (respectively Cr2) nearest to the site s. This value is taken from the list L1 (respectively L2) of size K1 (respectively K2) values. The size of the lists is determined in such a way as to obtain a ratio between the local maximum n and the local maximum n+1 greater than a threshold, set arbitrarily at 1.3. This makes it possible to take into account only the main saliency areas.

Figure 1:
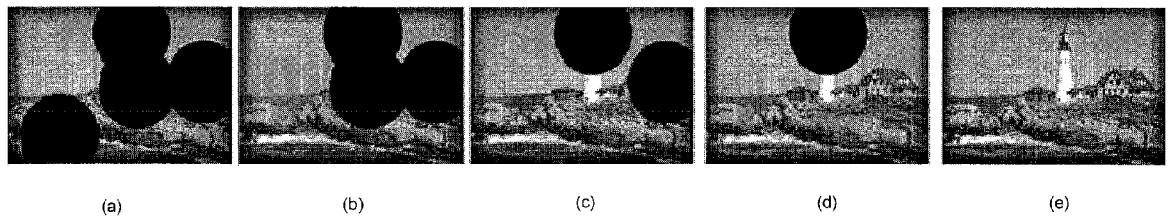
FIGS. 1(a)-1(e) show an exemplary search for the local maximums on the unmodified component A.

The local maximum n+1 is determined by inhibiting a circular area centred around the local maximum n and with a radius of two visual degrees represented in FIG. 1. The size of the circle is proportional to the viewing distance. FIGS. 1(a)-1(d) represent saliency maps created from different visual quantities, while FIG. 1(e) represents the image for which the saliency maps are created.

Following the intra-map competition step 24, an inter-map competition 26 is applied. This inter-map competition 26 exploits the redundancy and the complementarity of the different maps. The term Intermap is given by the following relation:

Intermap(s)=complementarity(s)+redundancy(s)

The term "complementarity(s)" is obtained by adding together the results of the intra-map competition:

complementarity(s)=$int\,raMap^{Cr1}(s)$+$int\,raMap^{Cr2}(s)$

The inter-map redundancy is processed on the basis of a joint analysis of the distributions of the maps to be merged.

$$redundancy(s) = intraMap^{Cr1}(s) \times intraMap^{Cr2}(s) \frac{Log\frac{N}{H(CS_{NQ}^{Cr1}(s),\,CS_{NQ}^{Cr2}(s))}}{3Log(L)}$$

N represents the number of sites of the maps concerned. The factor $$\frac{Log\frac{N}{H(CS_{NQ}^{Cr1}(s),\,CS_{NQ}^{Cr2}(s))}}{3Log(L)}$$

deduced from the combined histogram of the maps $CS_{NQ}^{C1}$ and $CS_{NQ}^{C2}$ modifies the value of the site s concerned according to its probability of appearing. The quantity of information conveyed by a site s is inversely proportional to its probability of appearing. Consequently, the above factor increases the value of a site s when its probability of appearing is low. Conversely, the value of the site s is reduced when its probability of appearing is high.

The merging of the maps $CS^{Cr1}$ and $CS^{Cr2}$ is given by the term intermap(s).

When the visual quantities Cr1 and Cr2 represent the chromatic components, a third saliency map relative to an achromatic component can also be introduced. A hierarchical approach is then introduced for carrying out the merging of the three saliency maps.

The saliency map is thus obtained by firstly merging the two saliency maps relative to the achromatic components and then performing a merging between this resultant chromatic saliency map and the achromatic saliency map.

Such a hierarchical approach can also be applied by merging a temporal saliency map with the spatial saliency maps. The chromatic and achromatic saliency maps are then merged according to the abovementioned hierarchical approach. A hierarchical merging of this spatial saliency map is then performed with the temporal saliency map.

The invention claimed is:

1. Method of obtaining a saliency map from a plurality of saliency maps created from different visual quantities, wherein it comprises
    a step for normalizing said saliency maps based on the theoretical maximum of each visual quantity,
    an intra-map competition step selecting the main saliency areas in each saliency map,
    an inter-map competition step implemented by a hardware processor and based on the sum of the intra-map competitions with an inter-map redundancy term that is a function of the product of the intra-map competitions and of the probability of a site appearing on said saliency maps.

2. Method according to claim 1, wherein, in the normalization step,
    the sites of said saliency maps are normalized in relation to the theoretical maximum of the visual quantity value,
    said maps are quantized linearly using a predetermined number of levels.

3. Method according to claim 1, wherein, in the intra-map competition step, a preliminary list is defined, containing the sites said to be salient including sites for which the visual quantity value is high, the preliminary list of the sites said to be salient is scanned in descending order of said values, and the other sites said to be salient present in a circular area centred around the site said to be salient and of a predetermined radius are inhibited, a list of the salient sites is established, including the non-inhibited sites for which the ratio with the value of the next higher value site is greater than a predetermined threshold.

4. Method according to claim 1, wherein the visual quantities are relative to the chromatic and achromatic components.

5. Method according to claim 4, wherein the saliency maps relative to the chromatic components are merged and then the resultant saliency map is merged with the saliency map relative to the achromatic component.

* * * * *